United States Patent
Bell et al.

(10) Patent No.: US 9,463,706 B2
(45) Date of Patent: Oct. 11, 2016

(54) INFRARED TRIANGULATION METHOD FOR LOCATING VEHICLES FOR HANDS-FREE ELECTRIC VEHICLE CHARGING

(71) Applicant: Ford Global Technologies, LLC, Dearborn, MI (US)

(72) Inventors: Christopher W. Bell, Livonia, MI (US); Allen Joseph Gilbert, Grosse Ile, MI (US); Richard Kai Wong, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 194 days.

(21) Appl. No.: 14/338,757

(22) Filed: Jul. 23, 2014

(65) Prior Publication Data

US 2016/0023556 A1   Jan. 28, 2016

(51) Int. Cl.
*H02J 7/00* (2006.01)
*B60L 11/18* (2006.01)
*H02J 7/02* (2016.01)
*H02J 5/00* (2016.01)

(52) U.S. Cl.
CPC .......... *B60L 11/182* (2013.01); *B60L 11/1833* (2013.01); *B60L 11/1835* (2013.01); *H02J 5/005* (2013.01); *H02J 7/025* (2013.01); *Y02T 10/7005* (2013.01); *Y02T 90/16* (2013.01)

(58) Field of Classification Search
CPC ............ B60L 11/1824–11/1838; Y02T 90/14; Y02T 10/7005; Y02T 90/128; Y02T 10/7088; Y02T 90/163
USPC ........................................................ 320/109
See application file for complete search history.

(56) References Cited

U.S. PATENT DOCUMENTS

| | | | |
|---|---|---|---|
| 6,097,476 A | 8/2000 | Kato et al. | |
| 8,184,018 B2 | 5/2012 | Chen et al. | |
| 2010/0161216 A1* | 6/2010 | Yamamoto | B60L 11/182 701/408 |
| 2010/0207771 A1* | 8/2010 | Trigiani | B60L 11/1816 340/636.1 |
| 2010/0277121 A1* | 11/2010 | Hall | B60L 11/182 320/108 |
| 2011/0141242 A1* | 6/2011 | Fernandez Alvarez | G06K 9/00818 348/47 |
| 2013/0099943 A1 | 4/2013 | Subramanya | |
| 2013/0191014 A1 | 7/2013 | Dalal et al. | |
| 2013/0338820 A1* | 12/2013 | Corbett | B60L 11/1824 700/232 |
| 2014/0021912 A1 | 1/2014 | Martin et al. | |

* cited by examiner

*Primary Examiner* — Arun Williams
(74) *Attorney, Agent, or Firm* — David B. Kelley; Brooks Kushman P.C.

(57) ABSTRACT

A charging system for charging a vehicle includes a charging station and a vehicle. The charging station includes a wireless charging coil, an infrared receiver oriented to receive infrared signals generated proximate the coil, and a first wireless communications device. The vehicle includes a charge plate, a first emitter configured to generate a first infrared signal, a second wireless communications device in communication with the first wireless communication device, an in-vehicle display, and at least one controller. The vehicle can include a second emitter to emit a second infrared signal. The controller is configured to present positional information via the display. The positional information corresponds to a vehicle position detected in response to the first infrared signal being received by the infrared receiver.

18 Claims, 5 Drawing Sheets

INFRARED TRIANGULATION METHOD FOR LOCATING VEHICLES FOR HANDS-FREE ELECTRIC VEHICLE CHARGING

TECHNICAL FIELD

This disclosure relates to charging stations and the recharging of batteries in electric and hybrid electric vehicles.

BACKGROUND

Charging methods for battery electric vehicles (BEVs) and plug-in hybrid electric vehicles (PHEVs) have increased in prevalence as advancements in vehicle propulsion and battery technology have occurred. Some charging methods include wireless charging, such as inductive charging. Inductive charging systems include a primary charging coil that is energized with an electric current. The primary charging coil induces a current in a secondary charging coil, which may be used to charge a battery.

SUMMARY

A plug-in vehicle according to the present disclosure includes a first emitter configured to generate a first infrared signal, a vehicle wireless communications device configured to communicate with a charging station wireless communication device, an in-vehicle display, and at least one controller. The controller is configured to present positional information via the display. The positional information corresponds to a vehicle position detected in response to the first infrared signal being received by a charging station infrared receiver.

In some embodiments, the vehicle further comprises a second emitter configured to generate a second infrared signal. In such an embodiment, the positional information corresponds to a vehicle position detected in response to the first infrared signal and second infrared signal being received by the infrared receiver. In one such embodiment, the positional information corresponds to a triangulated vehicle position based on a first time delay and a second time delay. The first time delay corresponds to a period between the first signal being produced and the first signal being received by the infrared receiver, and the second time delay corresponds to a time period between the second signal being produced and the second signal being received by the infrared receiver. In some embodiments, the at least one controller is further configured to coordinate an automatic vehicle parking event in response to the positional information. In one embodiment, the vehicle further includes a secondary charging coil In such an embodiment, the positional information includes a distance and lateral offset of the secondary inductive charging coil relative to a primary charging coil.

A wireless charging station according to the present disclosure includes a wireless charging coil, a housing proximate the coil, an infrared receiver retained within the housing, a wireless communications device, and a controller. The controller is in communication with the receiver. The controller is additionally configured to transmit vehicle positional information via the wireless communications device to an associated vehicle wireless communications device. The vehicle positional information is based on at least one signal from first and second associated emitters on a vehicle.

In some embodiments, the at least one infrared signal includes a first signal produced by the first emitter and a second signal produced by the second emitter. In such embodiments, the controller is further configured to triangulate the vehicle positional information in response to the first and second signals.

A plug-in vehicle according to the present disclosure includes a secondary wireless charging coil, a wireless communications device, first and second infrared emitters, an in-vehicle display, and a controller. The controller is configured to present positional information via the display. The positional information is received via the wireless communications device from an associated wireless charging station including an infrared receiver.

In one embodiment, the controller is further configured to coordinate an automatic vehicle parking event in response to the positional information. In an additional embodiment, the controller is further configured to command the first infrared emitter to produce a first signal and the second infrared emitter to produce a second infrared signal. In such an embodiment, the positional information corresponds to a triangulated vehicle position based on the first and second signals being received by the infrared receiver. In some such embodiments, the controller is further configured to triangulate the vehicle position based on a first time delay between the first signal being produced and the first signal being received by the infrared receiver and a second time delay between the second signal being produced and the second signal being received by the infrared receiver.

Embodiments according to the present disclosure provide a number of advantages. For example, the present invention provides a system for wirelessly charging a vehicle that enables precise vehicle parking relative to a charging station. Furthermore, charging stations according to the present disclosure may provide positioning information without direct line of sight to a vehicle.

The above advantage and other advantages and features of the present disclosure will be apparent from the following detailed description of the preferred embodiments when taken in connection with the accompanying drawings.

DETAILED DESCRIPTION

As those of ordinary skill in the art will understand, various features of the present invention as illustrated and described with reference to any one of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

Vehicles may be powered by battery electricity (BEVs) as well as by a combination of power sources including battery electricity. For example, hybrid electric vehicles (HEVs) are contemplated in which the powertrain is powered by both a battery and an internal combustion engine. In these configurations, the battery is rechargeable and a vehicle charger provides power to restore the battery after discharge.

Some vehicles and associated charging stations are equipped for hands-free wireless charging. To charge vehicles using such a system, the vehicle must be precisely located relative to the charger. A secondary charging coil in the vehicle must be positioned within a certain distance and orientation of a primary charging coil of the charger in order to effectively charge a vehicle battery.

One possible solution includes providing emitters or sensors on the vehicle that are equipped to detect a charging station location. However, such implementations must be sufficiently robust to function in the presence of road debris including tire-propelled mud, ice, or dirt. Robust sensors capable of withstanding such road hazards may be expensive. Moreover, positioning the emitters or sensors on the vehicle to allow the charger to be used with different vehicles which have different dimensions and different locations of the vehicle's charging coil. The charger senses the position of the emitters or sensors on the vehicle. The sensed data is then used by the vehicle directly or by the circuitry in the charger, once the vehicle type is identified, to determine the position of the vehicle relative to the charger and, specifically to the position of the vehicle charging coil and the coil of the charger.

Figure 1:
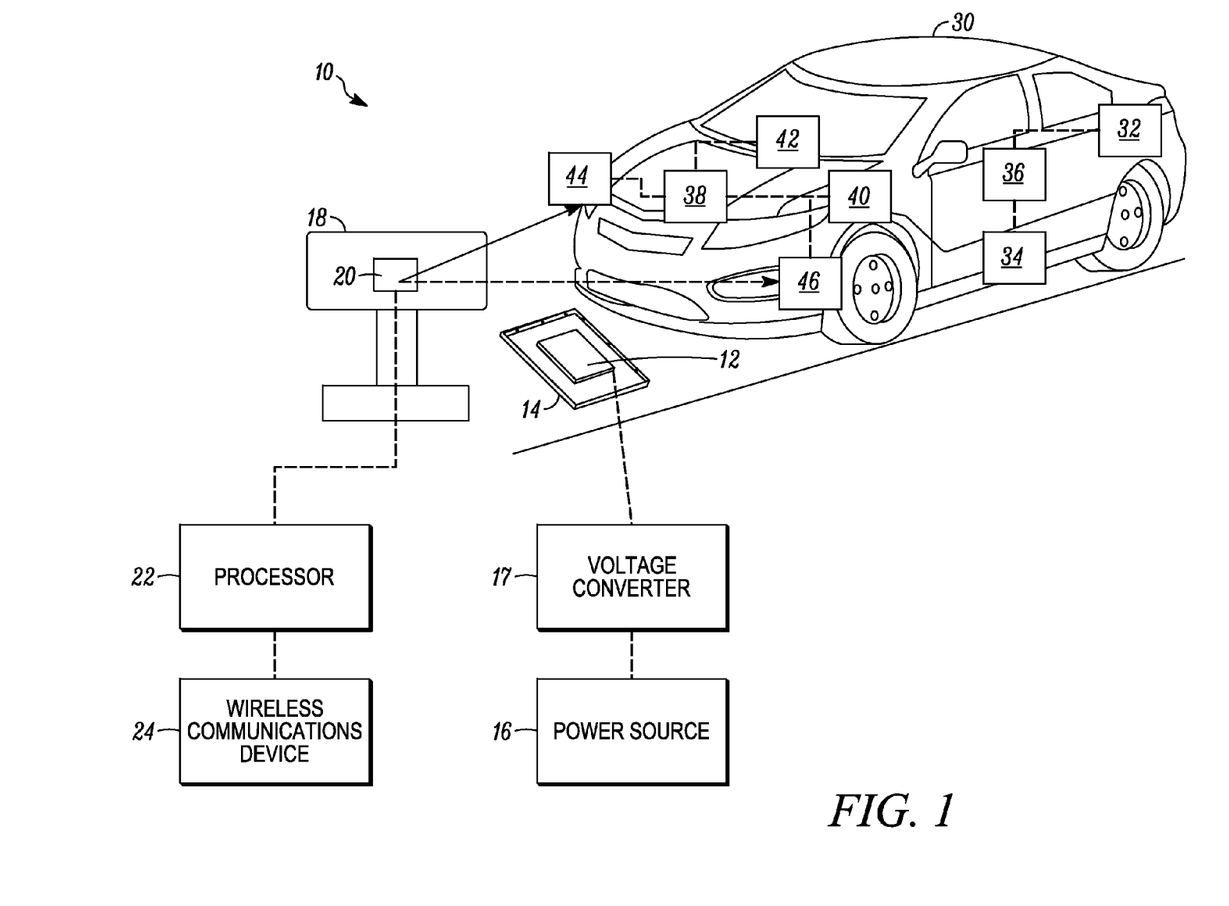
FIG. 1 is a schematic representation of a wireless charging system according to the present disclosure including a charging station and a plug-in vehicle.

FIG. 1 shows a charging system for a plug-in vehicle according to the present disclosure. The charging system includes a charging station 10. The charging station 10 is configured for inductive charging and includes a primary charging coil 12 housed within a primary induction charging plate 14. The primary charging coil 12 is electrically connected to an electric power source 16 via a power converter 17. The power converter 17 converts current from the power source 16 to a different voltage and/or frequency and provides current to the primary charging coil 12. The primary charging coil 12 generates an electromagnetic field about the primary induction charging plate 14. When a corresponding secondary coil is placed in proximity to the powered primary induction charging plate 14, it receives power by being within the generated electromagnetic field. The primary induction charging plate 14 may, in some embodiments, be provided with an articulated arrangement to raise and lower the primary charging coil relative to a vehicle for charging.

The wireless charging station additionally includes a housing 18 that is positioned proximate the primary induction charging plate 14. The housing 18 preferably includes a driver targeting aid to provide visual guidance to a driver. The driver targeting aid may include an arrow, a bull's-eye, crosshairs, or any other appropriate indicator of where to aim a vehicle for proper location relative to the primary induction charging plate 14. The wireless charging station further includes a sensor 20. The sensor 20 is associated with the housing and generally oriented with the primary induction charging plate 14. In an example, the charger knows the physical relationship of the sensor 20 relative to the charging plate 14 and coil 12. The sensor 20 is oriented to receive signals emitted in the vicinity of the primary induction charging plate 14. In an embodiment, the sensor 20 is a light receiver, e.g., an infrared receiver, or a non-human visible light receiver. In an example, the sensor 20 can detect wavelengths in the range of about 700 nm to about 1,000 nm. In an example, the sensor 20 is a near-infrared sensor. In some embodiments other types of sensors may be used, or a combination of light and other sensors may be used. Additional sensors may, of course, also be used.

The sensor 20 is in communication with a processor 22. The processor 22 may be configured to determine information relating to the position of the vehicle using the received light signals from the vehicle mounted emitters. The processor 22 may determine a binary equivalent to the image of received light, including the position of pixels that receive the light and the intensity of light on each pixel. The processor 22 may configured to calculate a position of a vehicle, including distance and horizontal offset, in response to signals from the sensor 20, as will be discussed below. The processor 22 is additionally in communication with a wireless communications device 24. The processor 22 is configured to transmit positional information of a vehicle to the vehicle via the wireless communications device 24. The processor 22 and wireless communications device 24 may be retained within the housing 18, primary induction charging plate 14, or other appropriate location. Communications cables may run between the housing 18 and components retained within the primary induction charging plate 14.

The charging system additionally includes a vehicle 30. The vehicle 30 is a battery electric vehicle (BEV) or plug-in hybrid electric vehicle (PHEV). The vehicle 30 includes a battery 32 and a secondary induction coil 34. The secondary induction coil 34 generates current in response to an electromagnetic field generated by the primary induction coil 12. The vehicle 30 additionally includes an AC-to-DC converter 36. The converter 36 converts AC current generated by the secondary induction coil 34 to DC current to recharge the battery 32.

The vehicle 30 additionally includes at least one controller 38. Although it is shown as a single controller, the vehicle controller 38 can include multiple controllers that are used to control multiple vehicle systems. For example, the vehicle controller 38 can be a vehicle system controller/powertrain control module (VSC/PCM). In this regard, the vehicle charging control portion of the VSC/PCM can be software embedded within the VSC/PCM, or it can be implemented in a separate hardware device. The vehicle controller 38 generally includes any number of microprocessors, ASICs, ICs, memory (e.g., FLASH, ROM, RAM, EPROM and/or EEPROM), circuitry and software code to co-act with one another to perform a series of operations. The vehicle controller 38 additionally communicates with other controllers and components over a hardline vehicle connection using a common bus protocol (e.g., CAN).

The controller 38 is in electric communication with a vehicle wireless communications device 40. The vehicle wireless communications device 40 is in wireless communication with the charging station wireless communications device 24. In an embodiment, the charging station wireless communications device 24 and vehicle wireless communications device 40 are both WiFi devices. Other wireless communications methods may of course be used, such as Bluetooth, cellular, Wireless Local Area Network, or Wireless Personal Area Networks. The controller 38 is configured to receive positional information via the vehicle wireless communications device 40. The positional information can be the raw data from the light sensor 20. In an example, the data from the light sensor is processed into positional information prior to being sent to the vehicle. The wireless communication between the vehicle wireless device 40 and charging station wireless communications device 24 may be used to transmit other information, as well. For example, the wireless communication may be used to complete an association procedure between the vehicle 30 and the charging station 10, in response to which vehicle charging may be initiated.

The controller 38 is additionally in communication with a driver display 42. The driver display may be a dashboard multifunction display or other displays as appropriate. The controller is configured to provide the positional information to a driver via the driver display 42. The driver display may include any appropriate representation of the vehicle positional information to illustrate the vehicle position and orientation, including distance and horizontal offset relative to the primary induction charging plate 14. In response to this information, the driver may more accurately park the vehicle with the secondary induction coil 34 proximate the primary induction charging plate 14.

The vehicle additionally includes a first light (e.g., infrared) emitter 44 and a second light (e.g., infrared) emitter 46. The infrared emitters 44 and 46 are in communication with the controller 38. The infrared emitters 44 and 46 are placed at specified locations near the front of the vehicle. In the embodiment illustrated, the first infrared emitter 44 is located on a passenger side of the vehicle and the second infrared emitter 46 is located on a driver side of the vehicle. The infrared emitters 44 and 46 are configured to emit light or light pulses, which can be at frequencies above those visible to humans. In an embodiment, the first light emitter 44 and the second light emitter 46 are electrically connected on a same circuit. In this fashion, a command to generate a light signal will trigger a simultaneous signal from both the first emitter 44 and the second emitter 46.

In some embodiments, the vehicle 30 is equipped with an auto park system. In such embodiments, a controller, which may be controller 38 or other appropriate controllers, issues commands to various vehicle systems to coordinate an automatic parking event. During an automatic parking event, vehicle steering, acceleration, and braking systems (not illustrated) are automatically controlled to park the car in an appropriate parking location and orientation. The controller will use the positional information from the charging station 10 to coordinate the various systems and park the vehicle with the secondary induction coil 34 proximate the primary induction charging plate 14 for charging.

Variations of the above system are, of course, possible. For example, the sensor 20 may be operatively coupled to the primary induction charging plate 14, rather than the housing 18 as illustrated in FIG. 1. In another variation, the sensor 20 is operatively coupled to the voltage converter 17. The above and other sensor locations may all be used in conjunction with methods according to the present disclosure. In some embodiments, the vehicle is equipped with an automatic parking system, and the positional information is used by an automatic parking system to facilitate hands-free parking of the vehicle in a charging position at vehicle charger.

Figure 2:
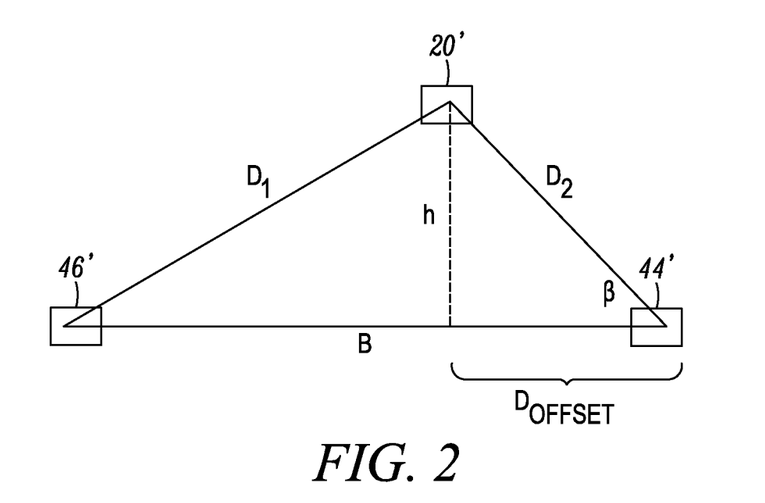
FIG. 2 illustrates a method determining a position and horizontal offset of a vehicle according to the present disclosure.

FIG. 2 shows a method for determining a distance and horizontal offset of a vehicle. A receiver 20' is mounted near a desired parking spot. First and second emitters 44' and 46' are coupled to a front portion of a vehicle, spaced apart by a known distance B. The emitters 44' and 46' are configured to generate first and second light signals, respectively, at substantially the same time. The receiver 20' receives the respective light signals generated by emitters 44' and 46', timestamps the arrival of the light signals, and senses the size and the per pixel intensity of the received light.

The system may calculate first and second time delays corresponding with the time elapsed between the generation of the light pulses and the reception of the first and second lightbursts, respectively. Based on the size of the light image at the sensor 20', the system may then calculate a first distance $D_1$ from the receiver 20' to the first emitter 44' and a second distance $D_2$ from the receiver 20' to the second emitter 46'. With that information, along with the known distance B between the light emitters 44' and 46', the charging system may generate a geometric triangle, the angles and sides of which represent positional information of the vehicle, including the distance of the vehicle from the receiver 20' and how far offset the centerline of the vehicle is from the position of the receiver 20'. Performing geometric and trigonometric computations based on the received data, the vehicle location can be determined with a high degree of accuracy. In an example, the distance B is stored in the vehicle and sent to the receiver 20' for the calculations to determine vehicle position. As a result, the charging system can be used with different cars and later makes of cars.

Heron's formula may be used to find the distance between the receiver 20' and the vehicle.

$$S = \frac{B + D_1 + D_2}{2}$$

$$A = \sqrt{S(S-B)(S-D_1)(S-D_2)}$$

where A equals the area of the triangle defined by B, $D_1$, and $D_2$.

Substituting the above calculated area into the formula for the area of a triangle, one obtains $$h = \frac{2A}{B}$$

where h is the distance from the receiver 20' to the vehicle.

Furthermore, the above-calculated figures may be used to determine an offset between the position of the receiver 20' and the centerline of the vehicle. Using the Law of Cosines and the Pythagorean Theorem, $$\beta = \cos^{-1}\left(\frac{B^2 + D_2^2 - D_1^2}{2BD_2}\right)$$

$$D_{offset} = \frac{h}{\tan\beta}$$

where $D_{offset}$ is the horizontal offset between the receiver 20' and the centerline of the vehicle. The above calculations can be done in processors or circuitry on the charger or in the vehicle.

Figure 3:
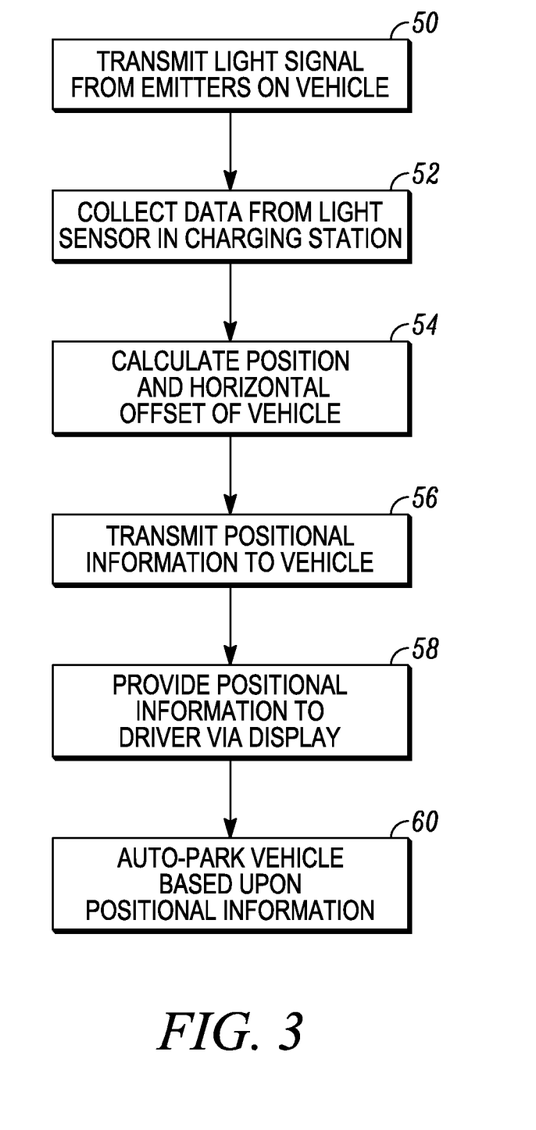
FIG. 3 illustrates a method for controlling a vehicle charging system according to the present disclosure in flowchart form.

FIG. 3 shows a method for controlling a vehicle charging system. A light signal is transmitted from light emitters on a vehicle, 50. Data is collected from a light sensor disposed in a charging station, 52. The distance, vertical offset and horizontal offset for a detected vehicle is calculated, 54. Positional information is transmitted to the vehicle, 56. Positional information is provided to the driver via an in-vehicle display, 58. In vehicles equipped with an auto-park system, the vehicle can be automatically parked based upon the positional information received from the charging station, 60.

In a variation of the above method, a vehicle with an auto-park system may be configured not to display positional information to the driver, as the driver does not need to interact with the vehicle during the parking process.

Figure 4:
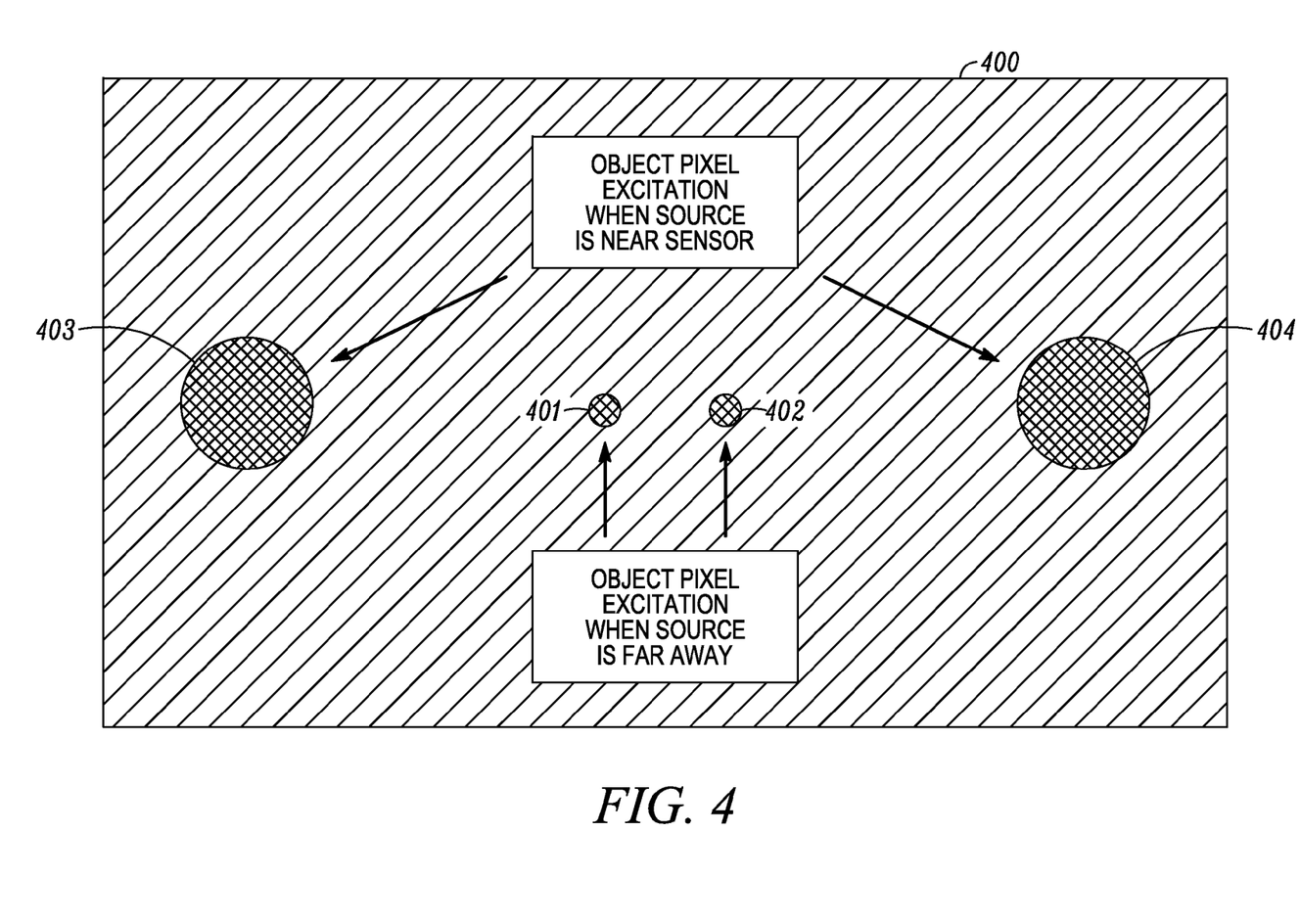
FIG. 4 illustrates examples of sensed light at a receiver of the vehicle charging system.

FIG. 4 shows a representation of a detection field 400 of a light sensor, e.g., an infrared sensor. The field 400 is divided into a plurality of pixels, i.e. a picture element. The pixels can number in the thousands, millions or more. Each pixel can be represented by a single light sensor that can include spatial resolution or a color filter. The light sensed at 401 represents the light from emitter 46 of the vehicle at a first time. The light sensed at 402 represents the light from emitter 44 of the vehicle at the first time. The sensed light 401, 402 has essentially the same size according the vehicle is driving straight toward the sensor 20 and charger housing 18, e.g., normal to the sensor. If the vehicle were driving toward the sensor at an angle, the one of the sensed light images 401, 402 would be larger than the other, that is, more pixels would detect light at one light image than the other light image. The light sensed at 403 represents the light from emitter 46 of the vehicle at a second time. The light sensed at 404 represents the light from emitter 44 of the vehicle at the second time. The sensed light 403, 404 has essentially the same size according the vehicle is driving straight toward the sensor 20 and charger housing 18, e.g., normal to the sensor. The vehicle at the second time is closer to the sensor 20 than at the first time, which can be determined by the greater number of pixels detecting light (403, 404) and the position of the illuminated pixels relative to the pixels detecting light (401, 402) at time one. The emitters 44, 46 on the vehicle direct light toward the centerline of the car such that the closer that the vehicle is to the sensor 20, the illumination moves outwardly from the center of the detection field 400.

Figure 5:
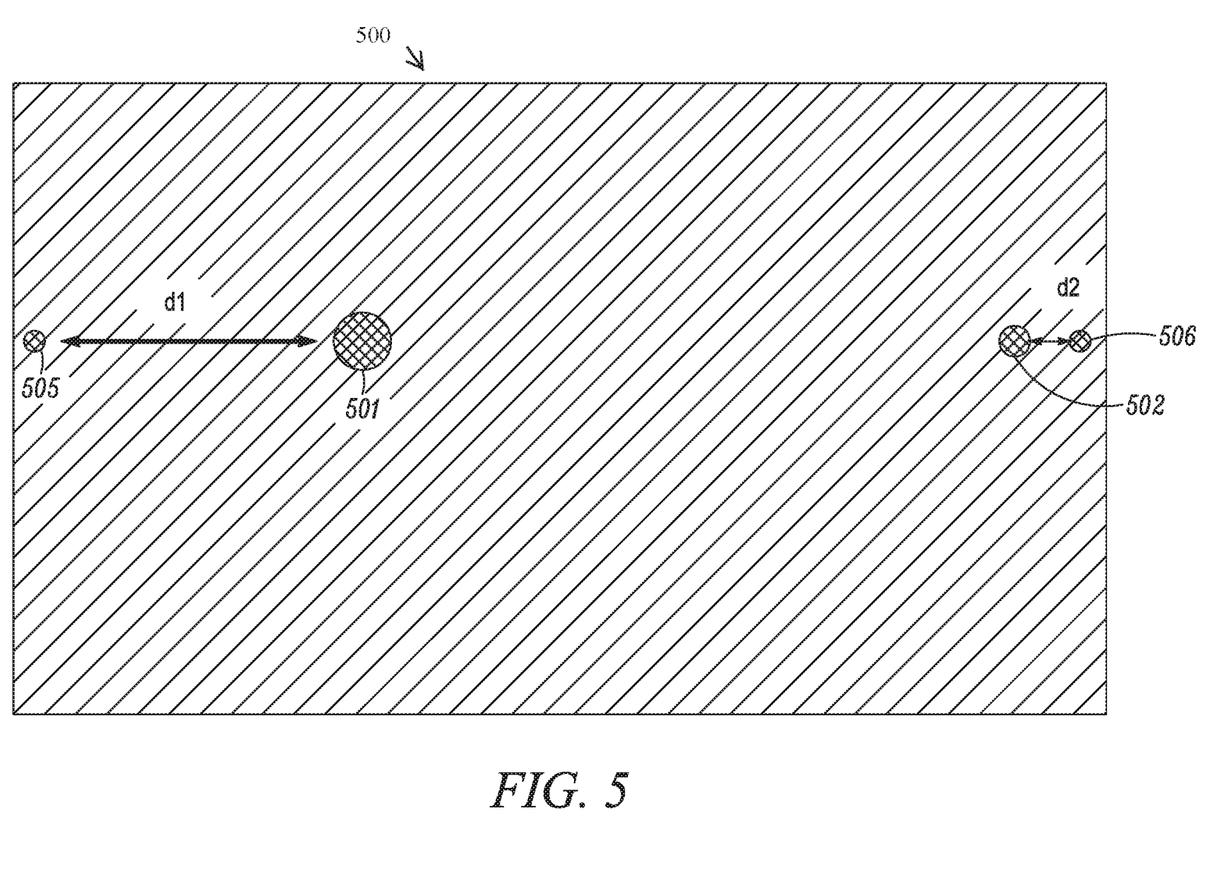
FIG. 5 illustrates an example of sensed light with an offset compared to a target vehicle position.

FIG. 5 shows a representation of a detection field 500 of a light sensor, e.g., an infrared sensor. The field 500, like detection field 400 is divided into a plurality of pixels, i.e. a picture element. The light sensed at 501 represents the light from emitter 46 of the vehicle at a third time. The light sensed at 502 represents the light from emitter 44 of the vehicle at the third time. The sensed light 501, 502 is offset an unequal amount from a target position, respectively. The sensed light 501 is positioned a distance d1, at 505. The sensed light 502 is positioned a distance d2, at 506. This indicates and can be determined using circuitry and processors in wither the vehicle or the charger that the vehicle is laterally offset by a distance (d1−d2) to the left. When the vehicle is properly positioned, the distances d1 and d2 are equal (d1=d2). Additionally, the vehicle is at an angle relative to the sensor. This can be determined based on the sensed light 501 being greater than the sensed light 502, e.g., 50% larger in number of illuminated pixels or twice the number of illuminated pixels.

Statistical analysis of the illumination of areas on the sensor can be used to determine the exact location of the vehicle. The size, light intensity, and location of the illuminated areas can be used to determine the position of the vehicle, laterally and the angle the vehicle is driving toward the sensor, which can be used to position the vehicle's charging coil relative to the charger's coil.

The sensor 20 can also detect the vertical position of the vehicle relative to a predicted vertical position. If the vehicle has different tires or suspension, than the original equipment manufacturer designed, the vehicle's coil may be higher or lower than expected. The sensor 20 can detect the different vertical position. This vertical position can be communicated to the vehicle and provided to the driver. Moreover, this data can be used to control the charger and the signal provided to the charging coil 12 for transmission to the vehicle coil.

Additionally, variations may be utilized in other parking situations requiring precise vehicle location. A similar triangulation method may thus be used in vehicles that are not equipped with charging plates, but must be precisely located relative to a target for other purposes.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

As can be seen from the various embodiments, the present invention provides a system for wirelessly charging a vehicle that enables precise vehicle parking relative to a charging station. Furthermore, charging stations according to the present disclosure may provide positioning information without direct line of sight to a vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
 a first emitter configured to generate a first infrared signal;
 a second emitter configured to generate a second infrared signal;
 a vehicle wireless communications device configured to communicate with a charging station wireless communications device;
 an in-vehicle display; and
 at least one controller configured to present positional information via the display, the positional information corresponding to a vehicle position detected in response to the first infrared signal and the second infrared signal being received by a charging station infrared receiver;
 wherein the controller is to determine an angle of entry of the vehicle using a difference in size of the first infrared signal and the second infrared signal at the charging station infrared receiver.

2. The vehicle of claim 1, wherein the positional information corresponds to a triangulated vehicle position based on a first size of the first infrared signal being sensed at the charging station by the infrared receiver and a second size of the second infrared signal being received by the infrared receiver.

3. The vehicle of claim 1, wherein the at least one controller is further configured to coordinate an automatic vehicle parking event in response to the positional information.

4. The vehicle of claim 1, further comprising a secondary inductive charging coil, wherein the positional information includes a distance and lateral offset of the secondary inductive charging coil relative to a primary inductive charging coil.

5. A wireless charging station for a vehicle comprising: an infrared receiver proximate a wireless charging coil; a wireless communications device; and a controller in communication with the infrared receiver and wireless communications device and configured to transmit vehicle positional information to an associated vehicle wireless communications device, the vehicle positional information being based on a difference in size of first and second infrared signals from a vehicle emitter received by the receiver; wherein the vehicle emitter includes a first emitter and a second emitter, wherein the first infrared signal is produced by the first emitter, wherein the second infrared signal is produced by the second emitter, and the controller is further configured to determine the vehicle positional information, including angle of entry, relative to the wireless charging coil in response to the first and second infrared signals being received by the receiver.

6. The wireless charging station of claim 5, further comprising a housing including a driver targeting aid, the housing being located proximate the coil to provide visual guidance to a driver, wherein the infrared receiver is retained within the housing.

7. The wireless charging station of claim 5, wherein the infrared receiver is operably coupled with the coil.

8. The wireless charging station of claim 5, further comprising a power converter electrically coupled with the coil, wherein the infrared receiver is operably coupled with the power converter.

9. A vehicle comprising:
a secondary wireless charging coil;
a wireless communications device;
first and second infrared emitters;
an in-vehicle display; and
a controller in communication with the secondary coil, communications device, first and second emitters, and display, the controller being configured to present positional information via the display, the positional information being based on infrared signals being emitted from the first and second emitters and being received via the wireless communications device from an associated wireless charging station including an infrared receiver;

wherein the controller is further configured to command the first infrared emitter to produce a first infrared signal and the second infrared emitter to produce a second infrared signal, and the positional information corresponds to a determined vehicle position based on the first and second signals being received by the infrared receiver; and wherein the controller is to determine an angle of entry of the vehicle using a difference in size of the first infrared signal and the second infrared signal at the infrared receiver.

10. The vehicle of claim 9, wherein the controller is further configured to coordinate an automatic vehicle parking event in response to the positional information.

11. The vehicle of claim 9, wherein the controller is further configured to triangulate the vehicle position based on at least one of a size and an intensity of the first infrared signal being received by the infrared receiver and at least one of a size and intensity of the second infrared signal being received by the infrared receiver.

12. The vehicle of claim 11, wherein the controller is to determine size and intensity of the first infrared signal and the second infrared signal on a pixel-by-pixel basis.

13. The vehicle of claim 12, wherein a number of pixels illuminated by the first infrared signal increases as the vehicle moves toward the infrared receiver.

14. An electric vehicle comprising: a first infrared emitter to produce a first infrared signal; a second infrared emitter to produce a second infrared signal; and a controller configured to transmit vehicle positional information, including angle of entry, relative to a wireless charging coil, the vehicle, and a charging station for display based on a difference in size of the first infrared signal and the second infrared signal received by an infrared receiver.

15. The electric vehicle of claim 14, wherein the controller is further configured to triangulate a vehicle position based on at least one of a size and an intensity of the first infrared signal being received by the infrared receiver and at least one of a size and intensity of the second infrared signal being received by the infrared receiver.

16. The electric vehicle of claim 14, wherein the controller is to determine size and intensity of the first infrared signal and the second infrared signal on a pixel-by-pixel basis.

17. The electric vehicle of claim 16, wherein a number of pixels illuminated by the first infrared signal decreases as the vehicle moves toward the receiver.

18. The electric vehicle of claim 14, wherein the vehicle positional information indicates an angle of a secondary coil on the vehicle relative a primary coil at a charging station.

* * * * *